United States Patent
Spitzer et al.

(10) Patent No.: US 10,298,645 B2
(45) Date of Patent: May 21, 2019

(54) OPTIMAL SETTINGS FOR APPLICATION STREAMING

(71) Applicant: Nvidia Corporation, Santa Clara, CA (US)

(72) Inventors: John Spitzer, Santa Clara, CA (US); Hassane Azar, Santa Clara, CA (US); Alok Ahuja, Santa Clara, CA (US); Tony Tamasi, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 96 days.

(21) Appl. No.: 14/698,296

(22) Filed: Apr. 28, 2015

(65) Prior Publication Data

US 2016/0323336 A1 Nov. 3, 2016

(51) Int. Cl.
- *G06F 15/16* (2006.01)
- *H04L 29/06* (2006.01)
- *H04L 29/08* (2006.01)

(52) U.S. Cl.
CPC .............. *H04L 65/60* (2013.01); *H04L 65/40* (2013.01); *H04L 65/4069* (2013.01); *H04L 65/4076* (2013.01); *H04L 67/142* (2013.01); *H04L 67/146* (2013.01); *H04L 65/80* (2013.01)

(58) Field of Classification Search
USPC ....... 709/227, 228, 223, 231, 203, 206, 217, 709/219, 224, 226, 230, 232, 238; 345/418; 370/201, 230; 375/240.01; 725/129

See application file for complete search history.

(56) References Cited

U.S. PATENT DOCUMENTS

| | | | |
|---|---|---|---|
| 8,276,133 B1 | 9/2012 | Lebaredian et al. | |
| 8,296,781 B1 | 10/2012 | Lebaredian et al. | |
| 9,565,227 B1* | 2/2017 | Helter | H04L 65/60 |
| 9,681,332 B2* | 6/2017 | Min | H04W 28/06 |
| 2002/0059638 A1* | 5/2002 | Oz | H04N 7/17318 725/129 |
| 2007/0239718 A1* | 10/2007 | Baxter | H04L 29/06027 |
| 2007/0245028 A1* | 10/2007 | Baxter | H04L 29/06027 709/228 |
| 2008/0049755 A1* | 2/2008 | Gannon | H04L 41/082 370/252 |

(Continued)

*Primary Examiner* — Quang N Nguyen

(74) *Attorney, Agent, or Firm* — Kevin Brown; Parker Justiss, P.C.

(57) ABSTRACT

A computer application streaming system includes an optimization unit coupled to a streaming device to determine streaming optimal playable settings for a remote user device corresponding to a selected computer application and a sending unit coupled to the optimization unit to manage streaming of the streaming optimal playable settings over a network connected to the remote user device. A receiving unit is coupled to the network to recover the streaming optimal playable settings for application to the remote user device when employing the selected computer application. An optional feedback unit is coupled to the remote user device to provide remote information over the network for modifying the streaming optimal playable settings, and an optional update unit is coupled to the streaming device to manage modification of the streaming optimal playable settings as directed by the remote information. A method of streaming a computer application is also provided.

19 Claims, 4 Drawing Sheets

(56) References Cited

U.S. PATENT DOCUMENTS

| | | | | |
|---|---|---|---|---|
| 2008/0082646 A1* | 4/2008 | Shenfield | ............... | H04W 12/08 |
| | | | | 709/223 |
| 2010/0030808 A1* | 2/2010 | Ress | ...................... | H04N 21/21 |
| | | | | 709/227 |
| 2012/0284421 A1* | 11/2012 | Xiao | ......................... | H04N 5/45 |
| | | | | 709/231 |
| 2013/0100803 A1* | 4/2013 | Menchaca | ............ | H04L 47/2475 |
| | | | | 370/230 |
| 2013/0128947 A1* | 5/2013 | Fryer | ................. | H04N 21/2402 |
| | | | | 375/240.01 |
| 2013/0208579 A1* | 8/2013 | Strobel | .................... | H04B 3/32 |
| | | | | 370/201 |
| 2013/0271447 A1* | 10/2013 | Setlur | .................... | G06F 1/1626 |
| | | | | 345/418 |
| 2015/0119149 A1* | 4/2015 | Spitzer | ..................... | A63F 13/77 |
| | | | | 463/43 |
| 2016/0173805 A1* | 6/2016 | Claus | ................... | H04N 17/004 |
| | | | | 348/148 |
| 2017/0024396 A1* | 1/2017 | Adarsh | ................. | G06Q 10/04 |
| 2018/0006764 A1* | 1/2018 | Howes | ................. | H04L 65/605 |

* cited by examiner

OPTIMAL SETTINGS FOR APPLICATION STREAMING

TECHNICAL FIELD

This application is directed, in general, to computer application optimization and, more specifically, to a computer application streaming system and a method of streaming a computer application.

BACKGROUND

Video gaming, played on a local gaming device (such as a personal computer), is a rapidly growing commercial field that is receiving a great deal of attention due to its universal interest and appeal. Since video game applications tend to be action oriented and often require almost photographic quality display images, gaming computer systems tend to be high performance units. These high performance units generally employ the three operational elements of a central processing unit (CPU), a graphics processing unit (GPU) and at least one high-quality image monitor. Optimizing game playability adjustments for a single user gaming environment employing these three operational elements may be supported by standardized selections or user selectable options that facilitate local gaming optimization. However, what is needed in the art is an improved way to optimize playability adjustments for the use of remote user devices that are dependent on local user devices.

SUMMARY

Embodiments of the present disclosure provide a computer application streaming system and a method of streaming a computer application.

In one embodiment, the computer application streaming system includes an optimization unit that that is coupled to a streaming device to determine streaming optimal playable settings for a remote user device corresponding to a selected computer application. The computer application streaming system also includes a sending unit that is coupled to the optimization unit to manage streaming of the streaming optimal playable settings over a network connected to the remote user device.

The computer application streaming system additionally includes a receiving unit that is coupled to the network to recover the streaming optimal playable settings for application to the remote user device when employing the selected computer application. The computer application streaming system may further include a feedback unit that is coupled to the remote user device to provide remote information over the network directed to modifying the streaming optimal playable settings. Here, an update unit is further included that is coupled to the streaming device to manage modification of the streaming optimal playable settings as directed by the remote user input information.

In another aspect, the method of streaming a computer application includes determining streaming optimal playable settings for a remote user device corresponding to a selected computer application, streaming the streaming optimal playable settings over a network to the remote user device and recovering the streaming optimal playable settings for application to the remote user device when employing the selected computer application. The method may also include providing remote information over the network directed to modifying the streaming optimal playable settings and modifying the streaming optimal playable settings as directed by the remote information.

The foregoing has outlined preferred and alternative features of the present disclosure so that those skilled in the art may better understand the detailed description of the disclosure that follows. Additional features of the disclosure will be described hereinafter that form the subject of the claims of the disclosure. Those skilled in the art will appreciate that they can readily use the disclosed conception and specific embodiment as a basis for designing or modifying other structures for carrying out the same purposes of the present disclosure.

BRIEF DESCRIPTION

Reference is now made to the following descriptions taken in conjunction with the accompanying drawings, in which.

DETAILED DESCRIPTION

Figure 1:
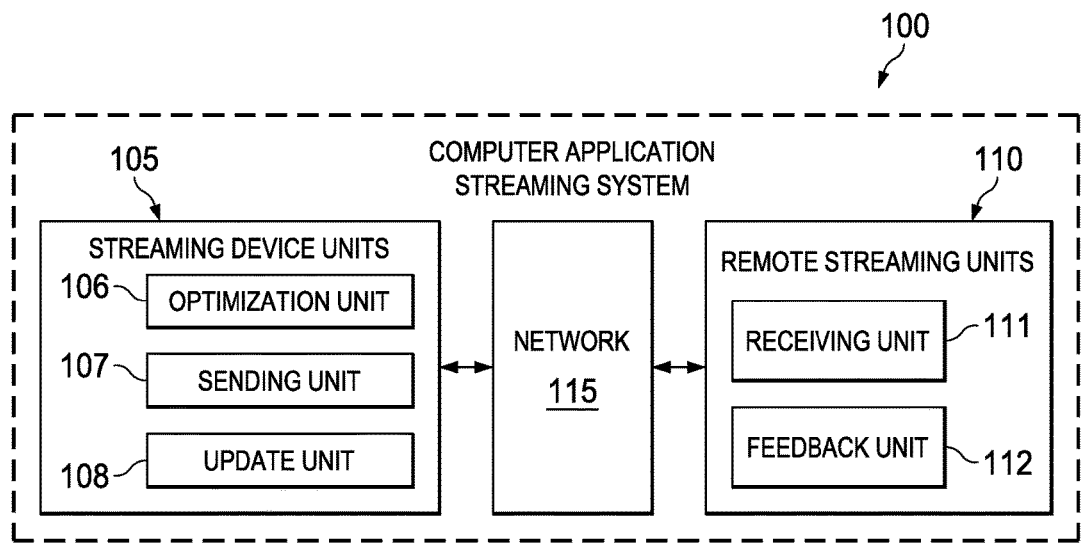
FIG. 1 illustrates an embodiment of a computer application streaming system constructed according to the principles of the present disclosure.

A local user device (e.g., a computing device) may employ settings that are dependent on parameters associated with the local user device. Additionally, these settings may need to be modified to correspond to a specific computer application (e.g., a gaming application) or user preferences. These playable settings may be optimized locally for enhancement of a local user computing experience to provide a balance between performance (e.g., frame rate) and image quality. Generally, the local user device and computer application requirements for parameter optimization are substantially stable over time and therefore basically time invariant. However, there are cases where an initiating (streaming) device is used to generate images of the computer application that are not intended for display locally. Instead, the images are intended for display on a remote user device.

Embodiments of the present disclosure are generally directed toward streaming of a computer application from a streaming device to a remote user device employing an interconnecting network. In the streaming environment, parameter optimization (i.e., generation of "streaming optimal playable settings") is extended to include an optimization based on remote user device parameters and interconnecting network parameters. These streaming optimal playable settings are defined as parameter selections that provide at least a specified minimum quality of remote user experience while employing the computer application on the remote user device.

Remote user device parameters may differ substantially from those of the streaming device and from one remote user device to another remote user device. A streaming environment may generally employ local and remote user devices that have different resolutions (e.g., display resolutions of 720, 1080 or 4K) or different display aspect ratios. A use of image interlacing and differing video rates may each affect latency and even require separate playability settings. Additionally for streaming, latencies associated with image capture, video encoding and video decoding typically need to be addressed and accommodated.

Additionally, criteria for determining streaming playability may often differ dramatically from those employed for local playability in a local user device, where local optimal playable settings may only enforce average (40 frames per second) and minimum (25 frames per second) performance thresholds, for example. Alternately for streaming applications, performance criteria may dictate that 95 percent of the frames streamed be under a certain time threshold (e.g., 16 milliseconds, such that a total latency is no more than 100 milliseconds).

Therefore, streaming parameter optimization may be more situation and time dependent, due to remote user device and mobility issues, remote end user optimization preferences or selections and variations in network capability. These generally contribute to changes in overall service quality (referred to below as transmission Quality of Service (QoS)) between the streaming device and remote user devices.

In one embodiment, the streaming optimal playable settings are determined before a streaming session begins to a remote user device, and these are maintained throughout the streaming session. In this case, changes in transmission QoS determine adjustments to encoding parameters during the streaming session. In another embodiment, initial streaming optimal playable settings are determined before a streaming session begins to a remote user device, and these are employed to initiate the streaming session employing appropriate encoding parameters. As the streaming session progresses, remote user-defined information is received that requires updating or modifying the initial streaming optimal playable settings and the encoding parameters during the streaming session.

FIG. 1 illustrates an embodiment of a computer application streaming system, generally designated 100, constructed according to the principles of the present disclosure. The computer application streaming system 100 includes streaming device units 105, remote streaming units 110 and a network 115 that connects the two. The streaming device units 105 include an optimization unit 106, a sending unit 107 and an update unit 108. The remote streaming units 110 include a receiving unit 111 and a feedback unit 112.

The optimization unit 106 is coupled to a streaming device to determine streaming optimal playable settings for a remote user device corresponding to a selected computer application. The sending unit 107 is coupled to the optimization unit 106 to manage streaming of the streaming optimal playable settings over the network 115 for the remote user device. The receiving unit 111 is coupled to the remote user device through the network 115 to recover the streaming optimal playable settings for application to the remote user device when employing the selected computer application.

The feedback unit 112 is coupled to the remote user device to provide remote information over the network 115 generally directed to modifying the streaming optimal playable settings. The update unit 108 is coupled to the streaming device to manage modification of the streaming optimal playable settings as directed by the remote information being fed back to the streaming device. The streaming device generally includes a local user device or a cloud server.

The streaming optimal playable settings for the remote user device include performance settings and image settings. The performance settings address display frame-rate parameters for the remote user device. A minimum frames per second ($FpS_{min}$) is selected for the remote user device, and this $FpS_{min}$ is at least maintained as transmission QoS between the streaming device and the remote user device varies over time (unless, of course, the transmission QoS capability degrades too much to support it).

The image settings address display pictorial parameters (i.e., image quality (IQ) parameters) for the remote user device. Here, the IQ parameters are provided (in addition to the $FpS_{min}$ parameter) to achieve enhancement of a display image for the remote user device. Specific IQ parameters provided typically depend on the transmission QoS between the streaming device and the remote user devices.

In embodiments of the present disclosure, providing performance parameters is given priority over providing image parameters. This means that for a given transmission QoS capability (i.e., a given "transmission bit budget"), a required minimum level of performance bits is maintained before IQ bits are employed as the transmission capability varies.

Additionally, the IQ parameters are generally provided to maximize a "quality per bit" of IQ transmission bits available. That is, an ordering of IQ parameter selections is provided that allows an increasing display image improvement for the IQ bits expended during periods of increasing transmission QoS. Correspondingly, this ordering of IQ parameter selections also allows a graceful display image degradation for the IQ bits expended during periods of decreasing transmission QoS.

Generally, sharp, rough or jagged edges in an image require a greater number of transmission bits to convey, thereby reducing quality per bit. That is, enhanced display detail requires more transmission bits. Therefore, a smoothing of these edges reduces transmission bit requirements. This may be accomplished through the use of antialiasing (AA), for example. Motion blurring in a transmitted image also provides transmission bit efficiency and quality per bit improvement.

If there is sufficient transmission QoS capacity, other IQ parameters may be employed even though they are not as transmission bit efficient. These include enhancing texture quality or texture resolution variants, enhancing shadow quality or enabling dynamic shadowing, and enabling anisotropic filtering, depth of field, ambient occlusion and PhysX effects (fire, snowflakes, etc.), as examples.

Figure 2:
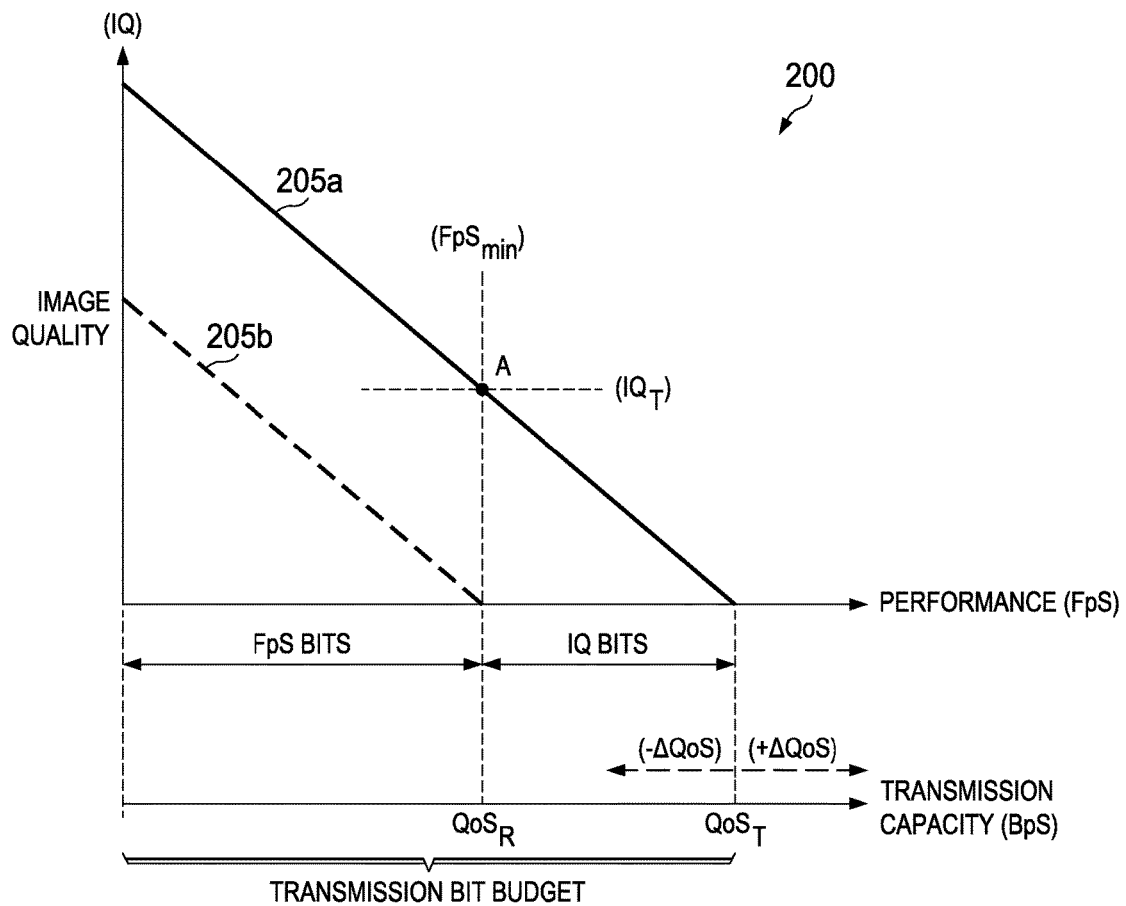
FIG. 2 illustrates a streaming parameters diagram constructed according to the principles of the present disclosure.

FIG. 2 illustrates a streaming parameters diagram, generally designated 200, constructed according to the principles of the present disclosure. The streaming parameters diagram 200 provides an example of streaming parameter relationships for performance, image and transmission parameters as employed to provide streaming optimal playable settings in streaming embodiments of the present disclosure. Performance parameters are generally designated as frames per second (FpS), image parameters are generally designated as image quality (IQ) and transmission parameters are generally designated as transmission capacity in bits per second (BpS).

The streaming parameters diagram 200 includes a typical locus of operation 205a. The typical locus of operation 205a illustrates an operating condition where both FpS parameters and IQ parameters are transmitted. This corresponds to a typical transmission $QoS_T$ that provides a transmission bit budget capable of supporting both FpS and IQ transmission bits, as shown. An operating point A reflects this condition where a minimum frames per second $FpS_{min}$ (e.g., 60 FpS) and a typical image quality $IQ_T$ are employed corresponding to the typical transmission $QoS_T$, as shown.

As the typical transmission $QoS_T$ increases (+ΔQoS), the minimum frames per second $FpS_{min}$ is maintained and the available IQ bits increase in an increased transmission bit budget. This allows for an increased IQ operating point above $IQ_T$, which expands the typical locus of operation 205a and raises the operating point A. As the typical transmission $QoS_T$ decreases (−ΔQoS), the minimum frames per second $FpS_{min}$ is again maintained and the available IQ bits decrease in a decreased transmission bit budget. This provides a decreased IQ operating point below $IQ_T$, which diminishes the typical locus of operation 205a and lowers the operating point A.

A restricted locus of operation 205b indicates a lower bound on the typical locus of operation 205a that is required to maintain the minimum frames per second $FpS_{min}$. Operations at or below this restricted transmission point $QoS_R$ provide no transmission capability for IQ parameters, unless the minimum frames per second $FpS_{min}$ is reduced.

Figure 3:
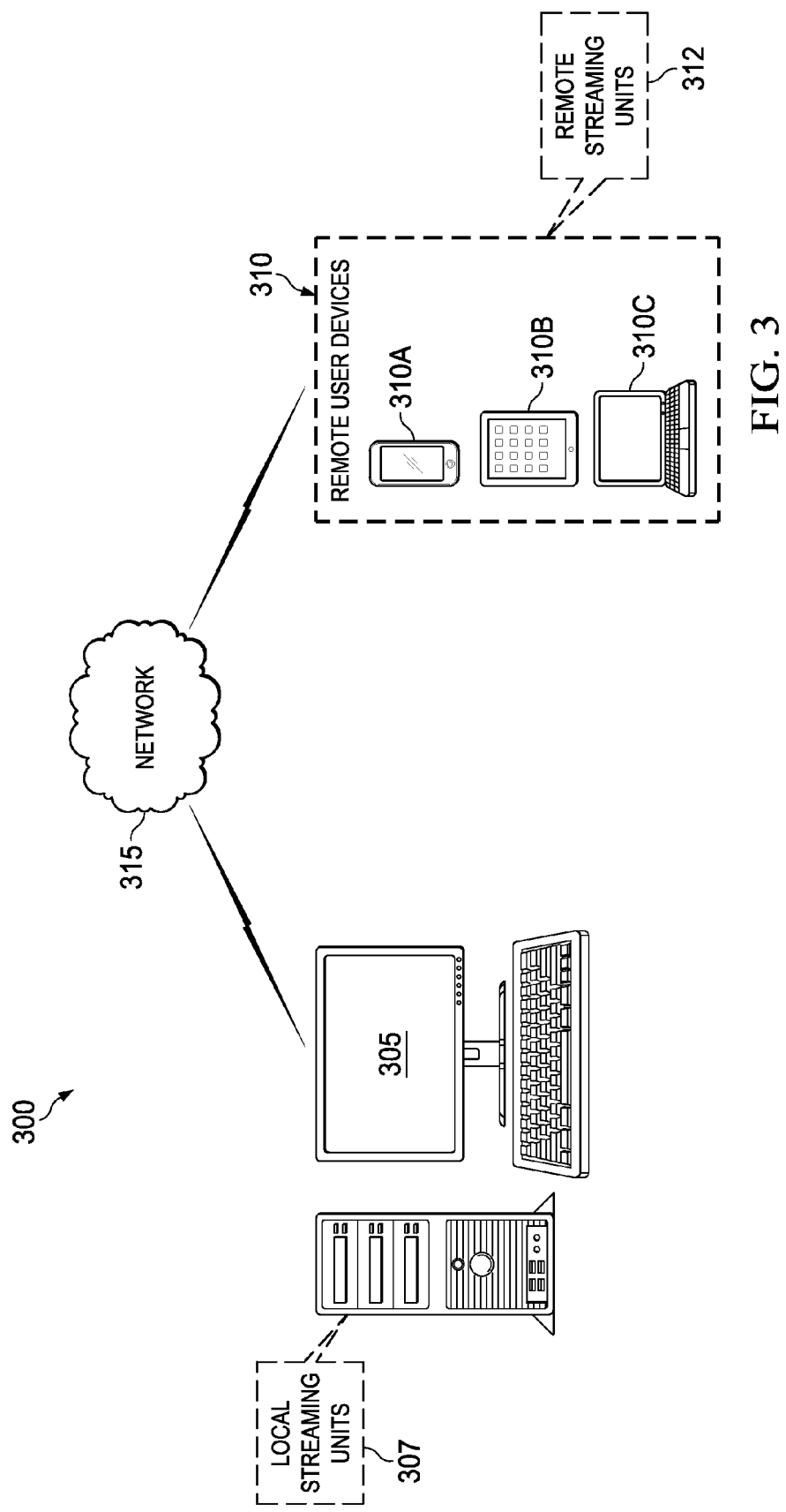
FIG. 3 illustrates a local user device streaming arrangement employing a computer application streaming system.

FIG. 3 illustrates a local user device streaming arrangement, generally designated 300, employing a computer application streaming system and constructed according to the principles of the present disclosure. The local user device streaming arrangement 300 is typically employed to transfer viewing of a computer application from a local computing device to a remote computing or display device. (In another embodiment, the local computing device may participate in viewing of the computer application in addition to streaming it to the remote computing or display device.) This viewing transfer is achieved in a manner to at least provide a minimum quality viewing experience on the remote device, where possible. This minimum quality viewing experience generally includes an acceptable balance between image quality and performance factors, such as display frame rate.

The streaming arrangement 300 includes a local user device 305, examples of remote user devices 310 and a network 315 connecting the two, as shown. In the illustrated embodiment, the local user device 305 is a desktop computer that provides a general purpose computing capability. The remote user devices 310 include a smartphone 310A, a computer tablet 310B and a notebook computer 310C, in this example. The network 315 is representative of a public or private network that supports communication between the local and remote user devices 305, 310. The network 315 may employ wireless or wireline connections and generally may include the Internet, a cellular communications network or a WIFI network, for example.

The streaming arrangement 300 also has a computer application streaming system, which includes local streaming units 307 and remote streaming units 312 that employ the network 315. In the illustrated embodiment, the local streaming units 307 are coupled to the local user device 305, and the remote streaming units 312 are coupled to the remote user devices 310. Generally, the local streaming units 307 include optimization and sending units, and typically include update units. Correspondingly, the remote streaming units 312 generally include receiving units and typically include feedback units.

In the embodiment illustrated, the local streaming units 307 may be included within the local user device 305 and may generally consist of software or hardware portions. Similarly, the remote streaming units 312 may be included within the remote user devices 310 and may generally consist of software or hardware portions, as well. In other embodiments, the local streaming units 307 or the remote streaming units 312 may be implemented separately from the local user device 305 or the remote user devices 310, respectively.

The optimization unit included within the local streaming units 307 determines streaming optimal playable settings that are to be employed for the remote user devices 310. These streaming optimal playable settings correspond to a selected computer application being streamed to one of the remote user devices 310. The sending unit is coupled to the optimization unit to manage streaming of the streaming optimal playable settings over the network 315 to the selected one (or ones) of the remote user devices 310 being employed.

As noted above, the update unit is typically included in the local streaming units 307, where it is coupled to the local user device 305 to manage a modification of the streaming optimal playable settings as directed by remote information. This remote information is supplied (i.e., fed back) over the network 315 from a selected remote user device to direct changes to currently employed streaming optimal playable settings based on transmission statistical or remote user-initiated information.

The receiving unit within the remote streaming units 312 is coupled to the network 315 to recover the streaming optimal playable settings for application to one of the remote user devices 310 when employing the selected computer application. As noted above, the feedback unit is typically included in the remote streaming units 312, where it is coupled to a selected remote user device and the update unit over the network 115 to provide the remote user input information directed at modifying the streaming optimal playable settings.

Figure 4:
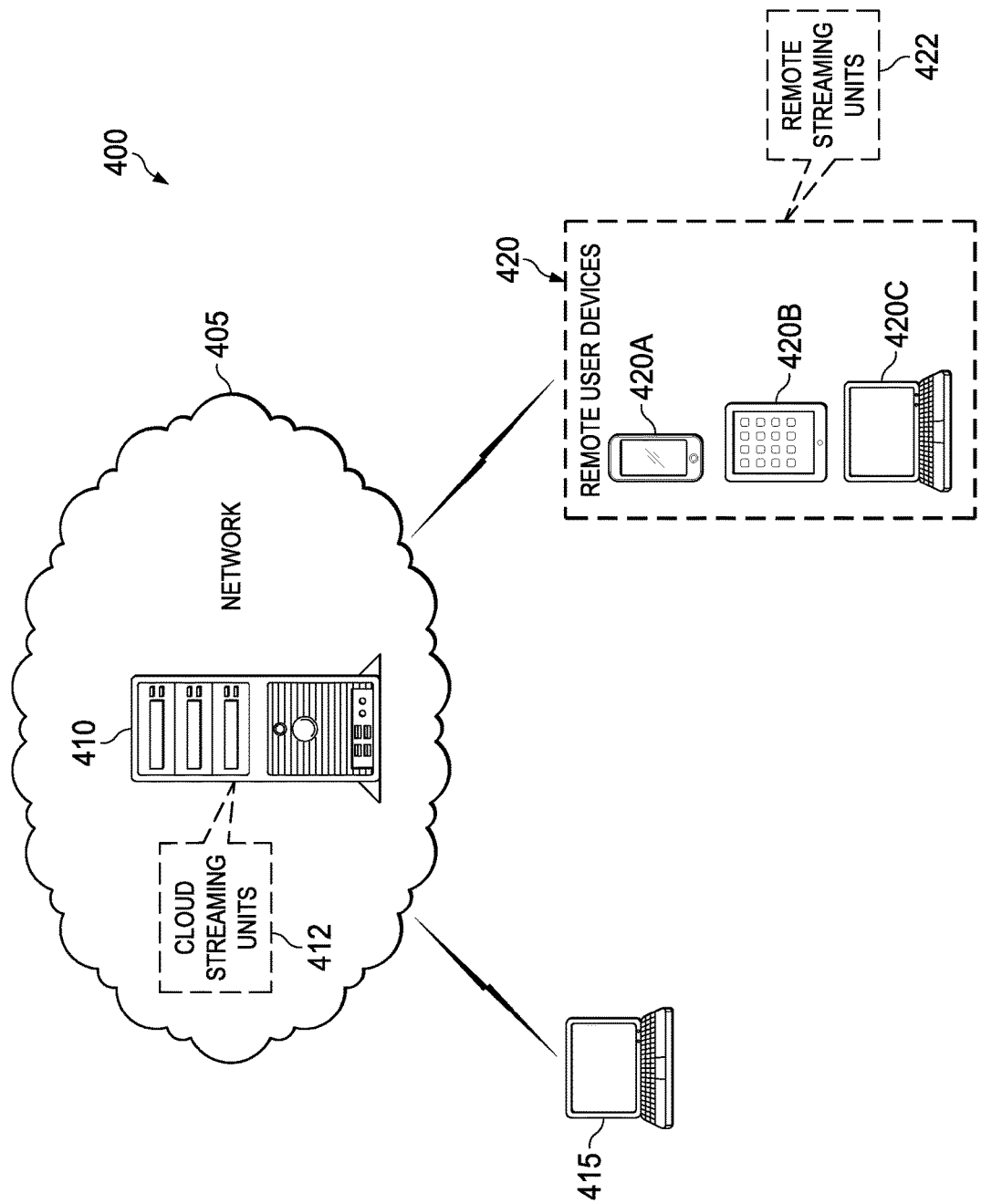
FIG. 4 illustrates a cloud server streaming arrangement employing a computer application streaming system.

FIG. 4 illustrates a cloud server streaming arrangement, generally designated 400, employing a computer application streaming system and constructed according to the principles of the present disclosure. The cloud server streaming arrangement 400 is typically employed to transfer viewing of a computer application from a cloud server to a remote computing or display device. Again, the viewing transfer is achieved in a manner to at least provide a minimum quality viewing experience on the remote device, where possible. This minimum quality viewing experience generally includes an acceptable balance between image quality and performance factors, such as display frame rate.

The streaming arrangement 400 includes a network 405, a cloud server 410, a local cloud terminal 415 and remote user devices 420. The network 405 is representative of a public or private network that supports communication between the cloud server 410, the local cloud terminal 415 and the remote user devices 420. The network 405 may employ wireless or wireline connections and generally may include the Internet, a cellular communications network or a WIFI network, for example. The local cloud terminal 415 is employed by a local user to provide general set-up and streaming instructions to the cloud server 410 and to receive general or specific information from the cloud server 410. The remote user devices 420 include a smartphone 420A, a computer tablet 420B and a notebook computer 420C, in this example.

The streaming arrangement 400 also includes a computer application streaming system, which has cloud streaming units 412 and remote streaming units 422 that employ the network 405. In the illustrated embodiment, the cloud streaming units 412 are coupled to the cloud server 410, and the remote streaming units 422 are coupled to the remote user devices 420. Generally, the cloud streaming units 412 include optimization and sending units, and typically include update units. Correspondingly, the remote streaming units 422 generally include receiving units and typically include feedback units.

In the embodiment illustrated, the cloud streaming units 412 may be included within the cloud server 410 and may generally consist of software or hardware portions. Similarly, the remote streaming units 422 may be included within the remote user devices 420 and may generally consist of software or hardware portions, as well. In other embodiments, the cloud streaming units 412 or the remote streaming units 422 may be implemented separately from the cloud server 410 or the remote user devices 420, respectively.

The optimization unit included within the cloud streaming units 412 determines streaming optimal playable settings that are to be employed for the remote user devices 420. These streaming optimal playable settings correspond to a selected computer application being streamed to one of the remote user devices 420. The sending unit is coupled to the optimization unit to manage streaming of the streaming optimal playable settings over the network 405 to the selected one (or ones) of the remote user devices 420 being employed.

As noted, the update unit is typically included in the cloud streaming units 412, where it is coupled to the cloud server 410 to manage a modification of the streaming optimal playable settings as directed by remote information. This remote information is supplied (i.e., fed back) from a feedback unit over the network 405 from a selected remote user device to direct changes to currently employed streaming optimal playable settings based on transmission statistical or remote user-initiated information.

The receiving unit within the remote streaming units 422 is coupled to the network 405 to recover the streaming optimal playable settings for application to one of the remote user devices 420 when employing the selected computer application. As noted above, the feedback unit is typically included in the remote streaming units 422, where it is coupled to a selected remote user device and the update unit over the network 405 to provide the remote user input information directed at modifying the streaming optimal playable settings.

Figure 5:
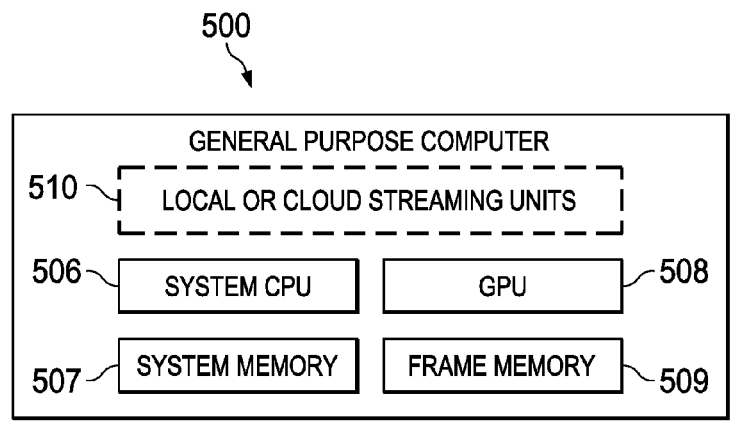
FIG. 5 illustrates a block diagram of an embodiment of a general purpose computer constructed according to the principles of the present disclosure.

FIG. 5 illustrates a block diagram of an embodiment of a general purpose computer, generally designated 500, constructed according to the principles of the present disclosure. The general purpose computer 500 may be employed as a local user device or as a cloud server as shown in the embodiments of FIGS. 3 and 4, respectively. The general purpose computer 500 may typically accommodate a wide variety of computer application software, although a computer gaming application is indicated above. The general purpose computer 500 is capable of providing display rendering information and streaming optimal playable settings for a remote user device when a computer application is to be streamed to the remote user device for its use there.

The general purpose computer 500 includes a system central processing unit (CPU) 506, a system memory 507, a graphics processing unit (GPU) 508 and a frame memory 509. The general purpose computer 500 also includes local or cloud streaming units 510, depending on its use.

The system CPU 506 is coupled to the system memory 507 and the GPU 508 to provide general computing processes and control of operations for the general purpose computer 500. The system memory 507 includes long term memory storage (e.g., a hard drive) for computer applications and random access memory (RAM) to facilitate computation by the system CPU 506. The GPU 508 is further coupled to the frame memory 509 to provide display and frame control information.

The local or cloud streaming units 510 are generally indicated in the general purpose computer 500, and in one embodiment, include a software module that may correspond to software included with a computer application or software that is independent of the computer application. The local or cloud streaming units 510 may operationally reside in the system memory 507, the frame memory 509 or in portions of both. The local or cloud streaming units 510 may alternately include a hardware portion or be totally implemented in hardware.

Generally, the local or cloud streaming units 510 are employed by the general purpose computer 500 to determine streaming optimal playable settings for a remote user device corresponding to a selected computer application and manage streaming of the streaming optimal playable settings over a network connected to the remote user device. Determination of the streaming optimal playable settings is based on providing at least a specified minimum quality of remote user experience while employing the computer application on the remote user device.

The local or cloud streaming units 510 include an optimization unit, a sending unit and an update unit, as discussed previously. The optimization unit determines streaming optimal playable settings that are to be employed for the remote user devices. The sending unit manages streaming of the streaming optimal playable settings and includes an encoder that provides transmission compression of the streaming optimal playable settings. The update unit manages a modification of the streaming optimal playable settings as directed by remote information.

Streaming optimal playable settings for performance and image settings may be determined in an offline process for use in a streaming session. The offline process determines a minimum frames per second ($FpS_{min}$) for performance and also determines image quality (IQ) settings that strike a balance for an overall good streaming experience (i.e., smooth frames delivery and good visual quality). This process involves changing the image quality settings (e.g., AA, Motion Blur, Shadows, Texture Quality, etc.) with transmission compression in mind.

This offline process captures frames from the application, with various combinations of image quality settings, and these frames are fed into the encoder (part of the sending unit) along with the same parameters used for actual application streaming. At least one of an objective visual quality metric such as a PSNR (peak signal to noise ratio) and a SSIM (structural similarity index) is measured. These are objective metrics for image quality where an original frame is compared against compressed frames at the encoder output. The combination that provides the highest quality (i.e., a highest PSNR or SSIM value while providing $FpS_{min}$) becomes the final recommended streaming optimal playable settings for this application.

In one embodiment, the specific types of streaming optimal playable settings are not changed during the streaming session. Here, transmission QoS dictates streaming independent of the streaming optimal playable settings chosen. If a transmission QoS is reduced during the streaming session requiring a reduction in image quality, image quality will degrade gracefully since the image settings are selected in a manner to maximize compression quality (quality per bit), thereby providing an image quality margin.

In another embodiment, the specific types of streaming optimal playable settings may be changed or updated to reflect a remote user request that was not originally included in the streaming optimal playable settings. This updating process may be accomplished offline to the streaming session and introduced at a point in time when the change or update is ready. Alternately, a current streaming session may be interrupted while the streaming optimal playable settings are changed or updated and a new streaming session initiated when ready.

Determination of streaming optimal playable settings may be facilitated by employing one or more remote user databases. These may include a remote user device database that provides general or specific parameters for available types of remote user devices. A remote user history database may be included where specific remote user devices employed by past users along with their corresponding streaming optimal playable settings are provided.

Alternately, an initial streaming optimal playable setting may be tried that is selected from a database of either "standardized" or recently employed streaming optimal playable settings. Also, a remote user "calibration" interchange may be employed to establish one or more streaming optimal playable settings that improve performance or image quality. This calibration interchange may typically employ a feedback unit at the remote user device and an update unit at the local user device to iterate to an improved remote user experience while employing the computer application on the remote user device. Additionally, the use of feedback and update may be employed to maintain or improve the remote user experience over time.

Determination of streaming optimal playable settings may also be facilitated by employing one or more network databases. These may include different types or combinations that employ an Internet database, a cellular communications database or a WI-FI database, for example, where each contains general or specific information that can be employed to facilitate determination of streaming optimal playable settings for remote user devices. The network databases may be organized into known and unknown network routes or paths to general or specific remote user device locations.

Figure 6:
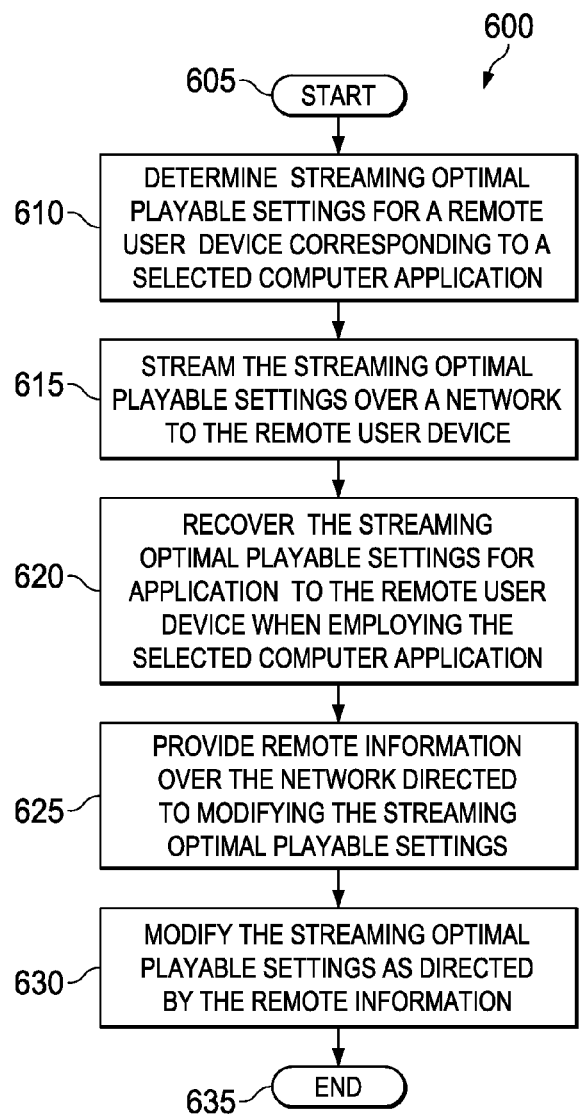
FIG. 6 illustrates a flow diagram of an embodiment of a method of streaming a computer application carried out according to the principles of the present disclosure.

FIG. 6 illustrates a flow diagram of an embodiment of a method of streaming a computer application, generally designated 600, carried out according to the principles of the present disclosure. The method 600 starts in a step 605, and then in a step 610, streaming optimal playable settings are determined for a remote user device corresponding to a selected computer application. The streaming optimal playable settings are streamed over a network to the remote user device, in a step 615, and the streaming optimal playable settings are recovered for application to the remote user device when employing the selected computer application, in a step 620. Remote information is provided over the network directed to modifying the streaming optimal playable settings, in a step 625. Then, the streaming optimal playable settings are modified as directed by the remote information, in a step 630.

In one embodiment, determining the streaming optimal playable settings is provided by a local user device or a cloud server. In another embodiment, the network includes the Internet, a cellular communications network or a WI-FI network. In yet another embodiment, the remote user device is a smartphone, a computer tablet or a notebook computer.

In still another embodiment, determining the streaming optimal playable settings is based on providing performance and image quality parameters, where providing the performance parameters is given priority over providing the image quality parameters. In a further embodiment, providing the image quality parameters is based on maximizing a quality per bit transmission.

In a still further embodiment, determining the streaming optimal playable settings for the remote user device is based on an objective visual quality metric such as a PSNR (peak signal to noise ratio) or an SSIM (structural similarity index). In a yet further embodiment, determining the streaming optimal playable settings is based on a network database, a remote user device database or a remote user history database. In yet another further embodiment, determining the streaming optimal playable settings is based on a remote user calibration interchange. The method 600 ends in a step 635.

While the method disclosed herein has been described and shown with reference to particular steps performed in a particular order, it will be understood that these steps may be combined, subdivided, or reordered to form an equivalent method without departing from the teachings of the present disclosure. Accordingly, unless specifically indicated herein, the order or the grouping of the steps is not a limitation of the present disclosure.

Those skilled in the art to which this application relates will appreciate that other and further additions, deletions, substitutions and modifications may be made to the described embodiments.

What is claimed is:

1. A computer application streaming system, comprising:
at least one remote user device;
a network; and
a local user device, the local user device comprising:
    a system central processing unit (CPU);
    a graphics processing unit (GPU);
    a system memory; and
    a frame memory, wherein the local user device is configured to:
        determine streaming optimal playable settings for streaming a selected computer application to the at least one remote user device over the network based on performance parameters and image quality parameters; and
        manage streaming of the streaming optimal playable settings over the network connected to the at least one remote user device, such that the image quality parameters are adjusted as needed to maintain a required minimum level of the performance parameters based on a quality of service (QoS) transmission capability of the network;
        wherein the image quality parameters are determined based on maximizing a quality per bit transmission and wherein an order of the image quality parameters is selected to allow an increasing display image improvement for image quality bits expended during increasing transmission QoS.

2. The system as recited in claim 1 wherein the streaming optimal playable settings are determined for the at least one remote user device based on an objective visual quality metric or based on a remote user calibration interchange.

3. The system as recited in claim 1 wherein the streaming optimal playable settings are determined based on one selected from the group consisting of:
a network database;
a remote user device database; and
a remote user history database.

4. The system as recited in claim 1 wherein the streaming optimal playable settings include network parameters.

5. The system as recited in claim 1, the system further configured to manage modification of the streaming optimal playable settings as directed by remote feedback information directed to modifying the streaming optimal playable settings.

6. The system as recited in claim 1 wherein the local user device is
a cloud server.

7. The system as recited in claim 1 wherein the remote user device is selected from the group consisting of:
a smartphone;
a computer tablet; and
a notebook computer.

8. The system as recited in claim 1 wherein the system is further configured to recover the streaming optimal playable settings for application to the at least one remote user device when streaming the selected computer application.

9. The system as recited in claim 1 where the performance parameters comprise display frame-rate parameters for the at least one remote user device.

10. The system as recited in claim 1 where the image quality parameters comprise display pictorial parameters for the at least one remote use device.

11. A method of streaming a computer application from a local user device to at least one remote user device over a network, comprising:
determining, by the local user device, streaming optimal playable settings for streaming a selected computer application from the local user device to the at least one remote user device over the network;
streaming, by the local user device, the streaming optimal playable settings from the local user device over the network to the at least one remote user device; and
recovering, by the at least one remote user device, the streaming optimal playable settings for application to the at least one remote user device when streaming the selected computer application, wherein:
the streaming optimal playable settings are determined by the local user device based on providing performance and image quality parameters;
the image quality parameters are adjusted as needed to maintain a requirement minimum level of the performance parameters based on a quality of service (QoS) transmission capability, of the network; and
the local user device comprises a system central processing unit (CPU), a graphics processing unit (GPU, a system memory, and a frame memory;
wherein providing the image quality parameters is based on maximizing a quality per bit transmission and wherein an order of the image quality parameters is selected to allow an increasing display image improvement for image quality bits expended during increasing transmission QoS.

12. The method as recited in claim 11 wherein determining the streaming optimal playable settings for the at least one remote user device is based on an objective visual quality metric.

13. The method as recited in claim 11 wherein determining the streaming optimal playable settings is based on one selected from the group consisting of:
a network database;
a remote user device database; and
a remote user history database.

14. The method as recited in claim 11 wherein determining the streaming optimal playable settings is based on a remote user calibration interchange.

15. The method as recited in claim 11 further comprising providing remote feedback information over the network directed to modifying the streaming optimal playable settings and managing modification of the streaming optimal playable settings as directed by the remote feedback information.

16. The method as recited in claim 11 wherein
the local user device is
a cloud server.

17. The method as recited in claim 11 wherein the remote user device is selected from the group consisting of:
a smartphone;
a computer tablet; and
a notebook computer.

18. The method as recited in claim 11 where the performance parameters comprise display frame-rate parameters for the at least one remote user device.

19. The method as recited in claim 11 where the image quality parameters comprise display pictorial parameters for the at least one remote use device.

* * * * *